United States Patent [19]

Nienhaus et al.

[11] 3,851,903
[45] Dec. 3, 1974

[54] COUPLER FOR CONNECTING TUBULAR MEMBERS

[75] Inventors: Clemens Nienhaus, Lohmar; Rudolph Pieper, Konigswinter; Hubert Eickenbusch, Augustin, all of Germany

[73] Assignee: Jean Walterscheid GmbH, Trier, Germany

[22] Filed: Sept. 13, 1973

[21] Appl. No.: 396,690

[30] Foreign Application Priority Data
Sept. 13, 1972 Germany.......................... 2244862

[52] U.S. Cl.................. 285/341, 285/378, 285/421
[51] Int. Cl.......................... F16l 17/02, F16l 19/06
[58] Field of Search .......... 285/341, 421, 378, 335, 285/339

[56] References Cited
UNITED STATES PATENTS
2,613,959   10/1952   Richardson........................ 285/341
3,512,812   5/1970    Kreidel et al...................... 285/341

FOREIGN PATENTS OR APPLICATIONS
749,395    5/1956    Great Britain...................... 285/341
1,912,337  10/1970   Germany........................... 285/341

Primary Examiner—H. Hampton Hunter
Attorney, Agent, or Firm—Edmund M. Jaskiewicz

[57] ABSTRACT

A threaded coupling comprises a nut which is threaded onto an element to define a space therebetween and a clamping ring having conical surfaces is wedged by corresponding conical surfaces on the element and nut into clamping relationship with the outer surface of a tubular member. The several interacting conical surfaces are provided with particular angular relationships and the bore of the clamping ring has annular grooves therein so as to grip the outer surface of the tubular member.

5 Claims, 3 Drawing Figures

COUPLER FOR CONNECTING TUBULAR MEMBERS

The present invention relates to a threaded coupling for tubular members, more particularly, to such a coupling which includes a nut threaded onto an element to retain a clamping ring in position on a tubular member.

Various forms of threaded couplers for pipes and tubes have been proposed. One such coupling comprises a threaded element having a bore tapering inwardly toward the interior of the element and a nut which can be threaded onto or into the element and also having a conical bore tapering away from the element and usually continuing into a cylindrical bore which is greater in diameter than the diameter of the pipe being connected. The coupling further comprises a clamping ring which is slid over the tubular member and retained between the element and the nut. Both ends of the clamping ring have outer conical surfaces that have the same directions of taper as the respective conical bores of the element and nut. The angle of taper of the ring outer conical surface toward the element is smaller than the angle of taper of the conical surface on the other end of the clamping ring. The ring may also be provided with internal annular grooves so as to grip more effectively the tubular member. Such a coupling is shown in German Pat. Nos. 894,399 and 956,187.

This prior art coupling has the disadvantage that the angles of taper of the conical surfaces in the element and the nut corresponding to the angles of taper of the respective conical surfaces on the ring. The surface contact pressure is thus relatively low so that an ineffective force is exerted on the connection between the tube and the ring. Also, the tightness of the seal between the ring and the element is relatively poor. The low specific contact pressure is particularly disadvantageous during the occurrence of any axial vibrations in the connected tubular member such as would occur through water hammer effects. A tight grip on the tubular members and a tight seal cannot be relied upon under those conditions where the joint is repeatedly loosened and tightened.

In addition, the foregoing coupling structure has the drawback that the connected tubular members may be constricted or locally compressed since no provision is made in such a coupling for limiting the tightening force.

It is therefor the principal object of the present invention to provide an improved coupling of the type generally referred to above which provides for effective gripping of the connected tubular members at high pressures and upon the occurrence of axial vibrations or impulses while at the same time provides effective sealing through high contact pressures without the risk of the annular grooves of the clamping ring producing a disadvantageous notching of the tubular members.

It is another object of the present invention to provide such a coupling wherein with increasing tightening force the corresponding increase of driving torque which is being applied to the nut during assembly of the coupling will indicate that an effective connection has been obtained.

According to one aspect of the present invention a threaded coupling for connecting tubular members may comprise an element having external threads at one end thereof and a bore therethrough with a conical surface at one end of the bore. A nut has an internal thread at one end of its bore so as to be adapted to be screwed onto the element. The bore through the nut comprises a first cylindrical portion inwardly of the internal threads and continues into an inwardly tapering conical surface and subsequently into a second cylindrical portion which has a diameter greater than the diameter of the tubular member being connected. The clamping ring is adapted to be slid over the tubular member and to be retained between the element and the nut. The ring has outer conical surfaces at both of its ends. The element end conical surface of the clamping ring has a smaller angle of taper than that of the nut end conical surface of the ring. There are annular grooves in the bore of the clamping ring. The angle of taper of the ring conical surface toward the element is greater than the angle of taper of the element conical surface. The maximum diameter of the ring conical surface toward the element is approximately equal to or less than the maximum diameter of the element conical surface. The clamping ring is provided with a second conical surface which extends from the maximum diameter portion of its conical surface directed to the element with the second conical surface tapering inwardly and connecting to a third conical surface which tapers outwardly to a peripheral cylindrical surface. The ring conical surface directed toward the nut has an angle of taper which is less than the angle of taper of the conical surface within the bore of the nut.

The angular relationship between the element conical surface and the ring conical surface directed to the element is such that an annular edge is formed at the contact area between these two conical surfaces which produces increased contact pressure in the portion of the clamping ring below this angular edge. As a result, the annular grooves within the clamping ring will penetrate the surface of the tubular member in this area. In a similar manner, the difference in the angles between the conical surface in the bore of the nut and the ring conical surface directed toward the nut will produce a line contact area which results in increased loading of the annular grooves of the clamping ring located in this area of stress.

Other objects and advantages of the present invention will be apparent upon reference to the accompanying description when taken in conjunction with the following drawings, which are exemplary, wherein.

Proceeding next to the drawings wherein like reference symbols represent the same parts throughout the various views a specific embodiment of the present invention will be described in detail.

Figure 1:
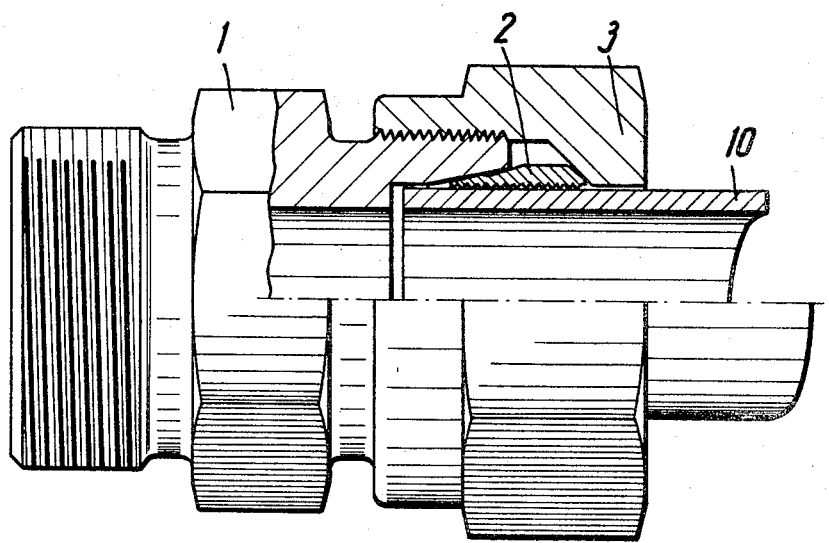
FIG. 1 is an elevational view of the assembled coupling of the present invention with the upper half of the coupling being shown in section.

As can be seen in FIG. 1, the coupling according to the present invention essentially comprises an element 1 having external threads on an end thereof, a nut 3 having internal threads so as to be threaded upon the element 1 and a clamping ring 2 which is retained between the element 1 and the nut 3. The nut 3 and clamping ring 2 are slid over a tubular member 10 which is to be tightly connected by clamping ring 2 after the coupling has been assembled in position. The clamping ring 2 performs the functions of retaining the tubular member 10, secures a tight connection with respect to the tubular member 10 and secures a tight connection with respect to the element 1.

The element 1 has a central portion provided with a hexagonal shape and external threaded portions projecting from both sides of the central portions. Passing through the element 1 is a bore having a conical surface 4 at one end thereof with this surface tapering toward the interior of the element. The taper of the bore 4 is indicated by the angle $\beta$ which is preferably 240° as measured in an axial plane passing through the longitudinal axis of the coupling.

Inwardly of the conical surface 4 is a cylindrical bore 5 at the end of which is an annular shoulder 6 whose inner diameter connects to a further cylindrical bore 21. The diameter of the cylindrical bore 5 is slightly greater than the outer diameter of the tube 10.

Figure 2:
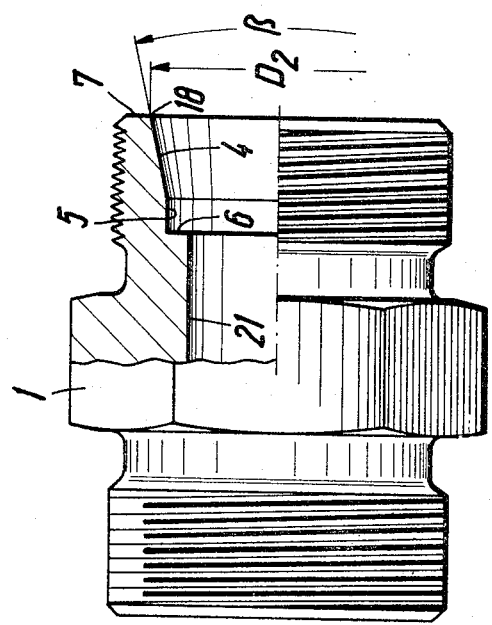
FIG. 2 is a view similar to that of FIG. 1 but showing the several elements of the coupling in their disassembled positions.

The clamping ring 2 is provided with a bore 17 therethrough in which are formed a plurality of annular grooves as shown in FIG. 2. The end of the clamping ring 2 which is directed toward or associated with the element 1 is provided with an external conical surface 11 whose angle of taper $\alpha$ is greater than the angle $\beta$ of conical bore 4 and preferably is approximately 30°.

Adjacent to the conical surface 11 is a further conical surface 12 but which tapers in the opposite direction with respect to the surface 11. A circular annular edge 22 is thus formed at the intersection of the conical surfaces 11 and 12. The greatest diameter of the conical surface 11 occurs at the annular edge 22 and is indicated $D_1$. The diameter $D_1$ is equal to or smaller than the greatest diameter $D_2$ of the conical bore 4 of the element 1. In the present embodiment, the diameter $D_1$ is slightly smaller than the diameter $D_2$.

Figure 3:
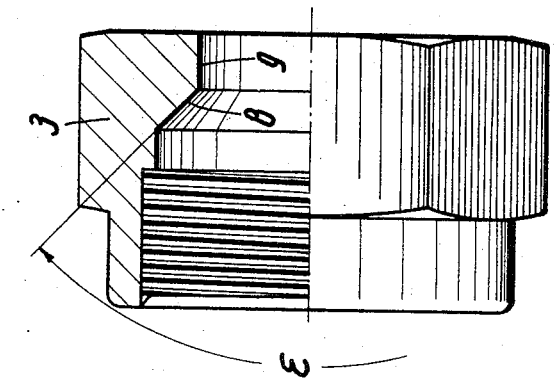
FIG. 3 is a portion of the clamping ring of FIG. 2 in enlarged scale to illustrate the relationships of the surfaces thereof.
Figure 3:
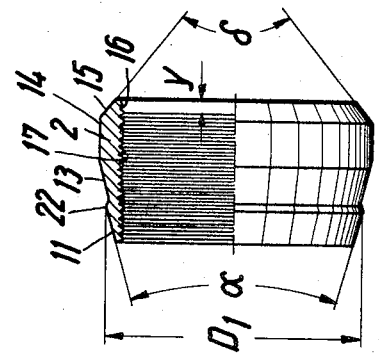
Figure 3:
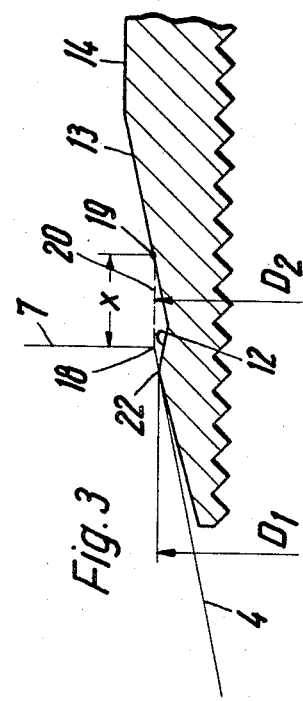

Subsequent to the conical surface 12 is a further conical surface 13 which tapers in the same direction as the conical surface 11. The surface 13 is so situated ono the clamping ring 2 that a line 20 drawn through a point 18 at the intersection of a face 7 of element 1 with the conical surface 4 of element 1 parallel to the longitudinal axis of the coupling will have a length X between point 18 and a second point 19 at which the line 20 intersects the conical surface 13. The length X will correspond approximately to the maximum axial displacement of the clamping ring 2 and is shown in detail in FIG. 3.

The conical surface 13 subtends an angle which is preferably 24° or equal to the angle of taper of the bore 4 of element 1. The conical surface 13 then passes into an outer cylindrical peripheral surface 14 on the clamping ring 2.

On the end of a clamping ring 2 facing toward the nut 3 there is an outer conical surface 15 which tapers in the opposite direction to the other end conical surface 11 and which has an angle of taper $\delta$ of approximately 75°. The nut 3 has a conical surface 8 tapering in the same direction as the conical surface 15 but has an angular taper $\epsilon$ which is greater than the angle of conical surface 15 of ring 2 and is preferably 90°.

The bore 17 of the clamping ring 2 has an conically enlarged portion at the nut end. This conical enlargement indicated at 16 and has a length Y which is equal to approximately one to two annular grooves. Within the nut 3 adjacent to the conical surface 8 is a cylindrical bore 9 which can be slid over the tube 10. The nut 3 is provided with an internal thread which can be screwed onto the external thread of the element 1.

When the coupling is assembled as shown in FIG. 1 the clamping ring 2 is retained securely between the element 1 and nut 3. The clamping ring 2 is slid over the tube 10 and inserted loosely into the element 1. Since the conical surface 11 of the ring 2 has an angle of taper which is approximately the same as or greater than the angle of taper of the surface 4 of the element 1 the distance X as described above will equal approximately the maximum axial displacement of the clamping ring. The second conical surface 13 of the clamping ring will engage the conical surface 4 of element 1 at approximately the time when the clamping ring has been displaced approximately the maximum distance. As a result of this engagement or abutment of the two surfaces the torque necessary to be applied to tighten the nut is distinctly and definitely increased. Subsequent tightening of the nut 3 will then cause the annular grooves of clamping ring 2 to press into the surface of tube 10 in the area below the annular edge 22. Also, the engagement of the element conical surface 15 with the nut conical surface 8 will cause the annular grooves of clamping ring 2 adjacent the enlarged conical portion 16 to be pressed into the surface of the tube 10.

The tightening of the nut 3 can also be limited by providing the clamping ring 2 with an abutment surface thereon which engages against the front surface 7 of the element 1.

The presence of the enlarged diameter portion 16 in the bore 17 of clamping ring 2 prevents excessive stressing of the clamping ring at its nut end since the load on the annular grooves at this end of the clamping ring is reduced by the length Y of this enlarged diameter portion.

The angular relationships between the engaging conical surfaces as described above thus result in exerting a favorable influence on the curve of the torque applied to tighten the nut, upon the sealing effect of the coupling and the anchoring or securing between the clamping ring and the connected tubular member. The different angles of taper as disclosed herein also produce a radially and axially pretensioning of the ring. As a result, the annular grooves of the ring are pressed into the tube 10 only in the area below the annular edge 22 and at the end of the bore adjacent the enlarged conical surface 16 while that portion of the ring therebetween is curved elastically. In addition, the outer annular edge 22 of the clamping ring produces a tight and effective sealing effect between the clamping ring 2 and the element 1. Pretensioning of the clamping ring during the assembly of the coupling results in high contact pressure and thus effective sealing between the element and the clamping ring on one hand and a secure gripping between the clamping ring and the tube on the other hand. The high contact pressure and the gripping will be provided even during the occurrence of axial vibrations or forces. The differential between the angles of taper of the clamping ring provides an especially favorable relationship between the tightening of the coupling and the torque to be applied to the nut, particularly in view of the larger angle of taper of the conical surface on the nut end of the clamping ring. At the same time, the present coupling not only provides an effective gripping of the tubular member even during repeated assembly or disassembly of the coupling but also avoids an undesirable compressing or crimping of the tubular member by limiting the axial displacement of the clamping ring.

It will be understood that this invention is susceptible to modification in order to adapt it to different usages and conditions, and accordingly, it is desired to comprehend such modifications within this invention as may fall within the scope of the appended claims.

What is claimed is:

1. A threaded coupling for tightly connecting tubular members and comprising an element having external threads on one end thereof and a bore therethrough with a conical surface (4) at one end of said bore, an annular nut having an internal thread at one end of its bore and adapted to be screwed onto said element, said nut bore comprising a first cylindrical portion inwardly of said internal threads continuing into an inwardly tapering conical surface (8) and a second cylindrical portion (9) having a diameter greater than the tubular member being connected, a clamping ring adapted to be slid over the tubular member and to be retained between said element and said nut and having outer conical surfaces at both its element and nut ends, the element end conical surface (11) of said ring having a smaller angle of taper ($\alpha$) than the nut end conical surface (15) on the ring and there being annular grooves in the bore of the ring, the taper angle ($\alpha$) of said conical surface (11) being greater than the taper angle ($\beta$) of element conical surface (4) and the maximum diameter of said ring conical surface (11) being approximately equal to or less than the largest diameter of said element conical surface (4), there being a second conical surface (12) on said ring from the maximum diameter of said conical surface (11) and tapering inwardly and connecting to a third conical surface (13) tapering outwardly to a peripheral cylindrical surface (14), said nut end conical surface (15) on said ring having an angle of taper ($\delta$) which is less than the taper angle ($\epsilon$) of nut bore conical surface (8).

2. A threaded coupling as claimed in claim 1 wherein said third conical surface (13) extends in the same direction of taper as said ring conical surface (11) and having an angle of taper approximately equal to or greater than the taper angle ($\beta$) of said element conical surface (4).

3. A threaded coupling as claimed in claim 1 wherein upon the insertion loosely of said ring into said element the distance between the intersection of said conical surface (4) for the element with the face of the element directed toward said ring and a point at the intersection of a line through said intersection and parallel to the longitudinal axis of the coupling with said third conical surface of said ring is approximately equal to the maximum axial displacement of said ring within the coupling.

4. A threaded coupling as claimed in claim 1 wherein the bore of said ring has a relatively short enlarged diameter portion at its end toward said nut.

5. A threaded coupling as claimed in claim 1 wherein said ring taper angle ($\alpha$) is approximately 30°, said element taper angle ($\beta$) is approximately 24°, said nut taper angle ($\epsilon$) is approximately 90° and said ring taper angle ($\delta$) is approximately 75°.

* * * * *